(12) United States Patent
Donaldson et al.

(10) Patent No.: US 11,893,057 B2
(45) Date of Patent: Feb. 6, 2024

(54) METHOD AND SYSTEM FOR TRANSLATING PUBLIC SAFETY DATA QUERIES AND RESPONSES

(71) Applicant: MOTOROLA SOLUTIONS, INC., Chicago, IL (US)

(72) Inventors: Roger Donaldson, Vancouver (CA); Jehan Wickramasuriya, St Charles, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 230 days.

(21) Appl. No.: 17/034,285

(22) Filed: Sep. 28, 2020

(65) Prior Publication Data
US 2022/0100798 A1 Mar. 31, 2022

(51) Int. Cl.
| | | |
|---|---|---|
| G06F 16/835 | (2019.01) | |
| G06Q 50/26 | (2012.01) | |
| G06F 21/53 | (2013.01) | |
| G06F 40/284 | (2020.01) | |
| G06F 40/205 | (2020.01) | |
| G06N 3/08 | (2023.01) | |
| G06N 3/045 | (2023.01) | |

(52) U.S. Cl.
CPC ......... *G06F 16/8358* (2019.01); *G06F 21/53* (2013.01); *G06F 40/205* (2020.01); *G06F 40/284* (2020.01); *G06N 3/045* (2023.01); *G06N 3/08* (2013.01); *G06Q 50/26* (2013.01); *G06F 2221/033* (2013.01)

(58) Field of Classification Search
CPC .. G06F 16/8358; G06F 40/284; G06F 40/205; G06F 21/53; G06F 2221/033; G06N 3/0454; G06N 3/08; G06Q 40/26
See application file for complete search history.

(56) References Cited

U.S. PATENT DOCUMENTS 6,009,422 A * 12/1999 Ciccarelli ......... G06F 16/24528
9,672,325 B2 * 6/2017 Robinson ............... G16H 10/60
(Continued)

FOREIGN PATENT DOCUMENTS

WO 2019050968 A1 3/2019

OTHER PUBLICATIONS

Donaldson, Roger et al.: "Natural Language Text Conversion and Method Therefor", U.S. Appl. No. 16/514,932, filed Jul. 17, 2019, all pages.

*Primary Examiner* — Hosain T Alam
*Assistant Examiner* — Robert F May (57) ABSTRACT

A method of processing a query to a database from a query source is provided, comprising: receiving the query, the query in a first format supported by the query source; inputting the query into a first neural network; outputting, by the first neural network, the query in a second format, wherein the second format is a format supported by the database; receiving, from the database, a response to the query, the response in the second format; inputting the response to the query into a second neural network; outputting, by the second neural network, the response to the query in the first format; wherein each neural network is trained by inputting a first plurality of pairs of semi-structured data, each pair of semi-structured data comprising a sample query or response in the first format and the sample query or response in the second format.

7 Claims, 6 Drawing Sheets

(56) References Cited

U.S. PATENT DOCUMENTS

| | | | |
|---|---|---|---|
| 9,830,315 B1 | 11/2017 | Xiao et al. | |
| 9,858,263 B2 | 1/2018 | Xiao et al. | |
| 9,971,778 B2 | 5/2018 | Vickers et al. | |
| 10,210,203 B2* | 2/2019 | Brette | G06F 16/2452 |
| 11,163,762 B2* | 11/2021 | Arnold | G06F 16/2452 |
| 2007/0162444 A1* | 7/2007 | Haselden | G06F 16/254 |
| 2013/0060803 A1* | 3/2013 | Maman | G06F 16/2452 |
| | | | 707/E17.014 |
| 2013/0346109 A1* | 12/2013 | Gunn | G16Z 99/00 |
| | | | 705/3 |
| 2014/0277604 A1* | 9/2014 | Nixon | G06F 9/54 |
| | | | 700/47 |
| 2017/0212829 A1 | 7/2017 | Bales et al. | |
| 2017/0315984 A1 | 11/2017 | Goyal et al. | |
| 2018/0284375 A1 | 10/2018 | Makino et al. | |
| 2019/0251109 A1 | 8/2019 | Ganjam et al. | |
| 2022/0198347 A1* | 6/2022 | Shi | G06F 16/254 |

\* cited by examiner

METHOD AND SYSTEM FOR TRANSLATING PUBLIC SAFETY DATA QUERIES AND RESPONSES

BACKGROUND TO THE DISCLOSURE

Federal, state and local database query is a task frequently carried out by law enforcement agencies. A challenge with these database queries is that while certain particulars about the requests are similar (for example, person's name, registration details, warrants, stolen car), each jurisdiction's database tends to have its own request and response format, making queries to a database in a different jurisdiction difficult to perform.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Federal, state and local database queries are frequently carried out by law enforcement and other public safety agencies. However, depending on the function and jurisdiction of the agency, these queries are often made in formats that do not match the format of the database being queried. Thus these queries often require time consuming human intervention to effectively translate the query and/or query response to a format understood by the database or query source especially given a multiplicity of heterogenous responses from the queried databases However as these queries and responses often include sensitive private information, such as criminal records, addresses, car registration details, etc., requiring human intervention includes a risk of disclosure of this information that can be avoided if the queries and responses are machine processed. Building manual parsers is not a complete solution, not only because of the risk of disclosure, but also the tedious building of rule-based logic that is fragile and time-consuming and which requires manually updates when formats change (sometimes unpredictably).

Thus, there exists a need for an improved technical method, device, and system for translating public safety data queries and responses.

In accordance with one example embodiment, a method of processing a query for a database from a query source is provided, comprising: receiving the query for the database, the query in a first format supported by the query source; inputting the query into a first neural network; outputting, by the first neural network, the query in a second format, wherein the second format is a semi-structured format supported by the database; receiving, from the database, a response to the query, the response in the second format; inputting the response to the query into a second neural network; outputting, by the second neural network, the response to the query in the first format, wherein the first neural network is trained by inputting a first plurality of pairs of semi-structured data, each pair of semi-structured data comprising a sample query in the first format and the sample query in the second format; and wherein the second neural network is trained by inputting a second plurality of pairs of semi-structured data, each pair of semi-structured data comprising a sample response in the second format and the sample response in the first format.

The first neural network may be pre-trained with a plurality of queries in the second format. The second neural network is pre-trained with a plurality of responses in the second format. The query in the first format and the query in the second format may be used to further train the first neural network. The response in the second format and the response in the first format may be used to further train the second neural network.

In accordance with another example embodiment, a method of processing a query to a plurality of public safety databases from a query source is provided, comprising: receiving the query for the plurality of public safety databases, the query in a first format supported by the query source; inputting the query into a plurality of first neural networks; outputting, by each neural network in the plurality of first neural networks, the query in a plurality of respective second formats, wherein each second format is a semi-structured format supported by a respective one of the plurality of public safety databases; receiving, from the plurality of public safety databases, a corresponding plurality of responses to the query, the responses in a plurality of different second formats; inputting each of the plurality of responses to the query into a corresponding second neural network of a plurality of second neural networks; outputting, by each of the second neural networks, a corresponding modified second responses to the query in the first format; wherein the plurality of first neural networks are trained by inputting a first plurality of pairs of semi-structured data, each pair of semi-structured data comprising a sample query in the first format and the sample query in the second format;

and wherein the plurality of second neural networks are trained by inputting a second plurality of pairs of semi-structured data, each pair of semi-structured data comprising a sample response in the second format and the sample response in the first format.

The first and second pluralities of neural networks may be pre-trained in a trusted execution environment with respect to the plurality of public safety databases, without providing access to a plurality of sample queries to the query source.

The method may further comprise, for each of the plurality of public safety databases, determining if a parser already exists for each particular one of the plurality of public safety databases, and on determination of the existing parser, training corresponding first and second neural networks of the plurality of first neural networks and the plurality of second neural networks, respectively, in a supervised manner using the existing parser, otherwise, training the first and second neural networks in an unsupervised pre-training manner followed by a supervised manner on a subset of data used in the first step.

A data processing system is provided, comprising: a processor; and a memory device having stored thereon computer program code that is executable by the processor, and that when executed by the processor causes the processor to perform the methods described herein.

A method for extracting information fields from structured text using a processor is provided, the structured text received from a database, comprising: inputting the structured text into the processor; lexing the structured text into tokens; ordering the tokens into a plurality of spans of tokens; labeling each of the plurality of spans of tokens to represent a corresponding common format output field; translating each of the plurality of spans of tokens according to a common output specification into translated token spans; associating the translated token spans with the corresponding common format output field into key-value pairs; and outputting the key-value pairs.

The lexing may be done by a subword tokenizer, which may be trained based on automated access to a plurality of examples of structured text from the database. The labeling may be done by a neural network, which may be trained by automated and temporary exposure to a plurality of examples of structured text from the database and a plurality of key-value pairs. The neural network training may take place in a trusted execution environment and neither the examples of structured text from the database nor the plurality of key-value pairs may be exposed to any human user.

The neural network may be pre-trained by repeatedly: inputting an example of structured text from the database; adjusting weights of the neural network to perform an unsupervised task; deleting the example of structured text; then conducting supervised training comprising: repeatedly: inputting a plurality of structured text from the database and labeled spans of each of the plurality of structured text into the neural network; tokenizing the structured text into a plurality of tokens and identifying tokens in the labeled spans; applying the pre-trained neural network to compute feature values over the tokens; and adjusting at least a weight of the neural network. The pre-training may take place in a trusted execution environment.

The supervised training may further comprise: applying a supervised model to the plurality of structured text from the database to predict labeled spans; applying a pre-trained model to the structured text to compute feature values over the tokens in the labelled spans; receiving correction of the predicted labeled spans; and updating the supervised model according to the correction of the predicted labeled spans and the computed feature values over the tokens.

Each of the above-mentioned embodiments will be discussed in more detail below, starting with example system and device architectures of the system in which the embodiments may be practiced, followed by an illustration of processing blocks for achieving an improved technical method, device, and system for translating public safety data queries and responses.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

This disclosure describes various example embodiments. It is contemplated that any part of any example embodiment described herein may be implemented or combined with any part of any other example embodiment described herein.

Further advantages and features consistent with this disclosure will be set forth in the following detailed description, with reference to the figures.

Figure 1:
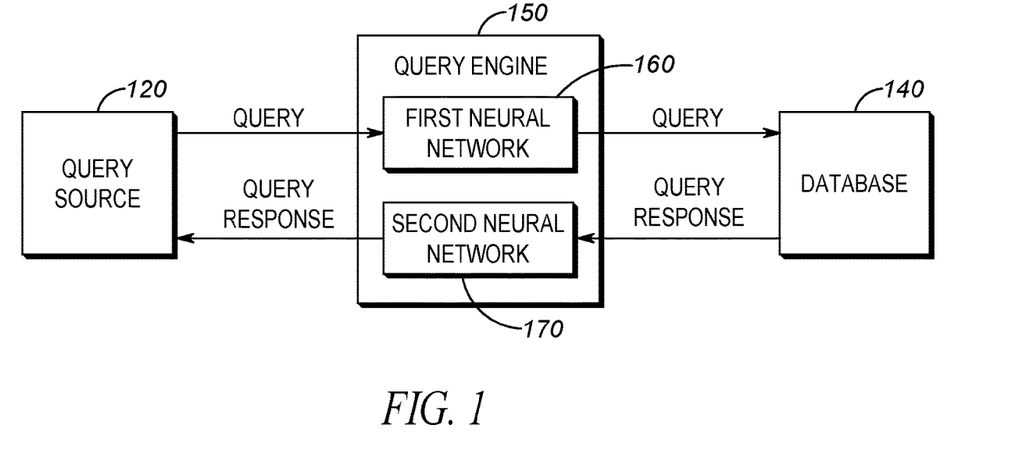
FIG. 1 shows a block diagram of a system for translating structured data, according to an example embodiment.

Reference is now made to FIG. 1 which shows a block diagram of an example system 100 for translating public safety data queries and responses within which methods in accordance with example embodiments can be carried out. System 100 includes query source 120, which may be a public safety entity within a jurisdiction that is sending a query in a first format that is supported by query source 120, to a database 140 that is associated with a different public safety entity or jurisdiction. Query engine 150 receives the query from query source 120 and uses a first neural network 160 to translate the query into a second format, the second format being supported by the database 140.

Database 140 processes the query in the second format, and returns a query response in the second format. Query engine 150 receives the query response in the second format and uses a second neural network 170 to translate the query response to the first format supported by the query source. The response in the second format is then provided to the query source.

Query source 120, according to an example embodiment, may be a computing system, including a processor, memory, and input/output means, such as mouse, keyboard, display, printer, etc. In an embodiment query source 120 is associated with a public safety organization, such as law enforcement, fire department, customs enforcement, homeland security, a hospital, mental health facility, etc.

The query from query source 120 is encrypted and may be a request for information about a person, place or vehicle. Examples of queries include information about a person, such as an address, a criminal record, warrants, associates of the person, missing persons, etc.; information about a vehicle, such as registration information, or whether the vehicle has been reported as stolen; information about a place or corporation, such as ownership or management information; and information about articles of interest, for example license plates, guns, securities, boats, etc.

Database 140, in an example embodiment, is part of a computing system, including a processor, memory, and input/output means, such as mouse, keyboard, display, printer, etc. In an embodiment database 140 is associated with a public safety organization, such as law enforcement, fire department, customs enforcement, homeland security, a hospital, mental health facility, etc.

The query and/or query response may be in a structured format, which is a format in which the data in the format conforms to a data model that has a well defined structure, follows a consistent order, and can be easily accessed and used by a person or a computer program. Structured data is usually stored in well-defined schemas within database 140.

The query and/or query response may be in a semi-structured format, which does not follow a tabular structure of data models associated with relational databases or other forms of data tables, but contains tags or other markers to separate semantic elements and enforce hierarchies of records and fields within the data. In semi-structured formats, entities belonging to the same class may have different attributes even though they are grouped together, and the attributes' order is not important. Semi-structured formats are often found in object-oriented databases.

Figure 2:
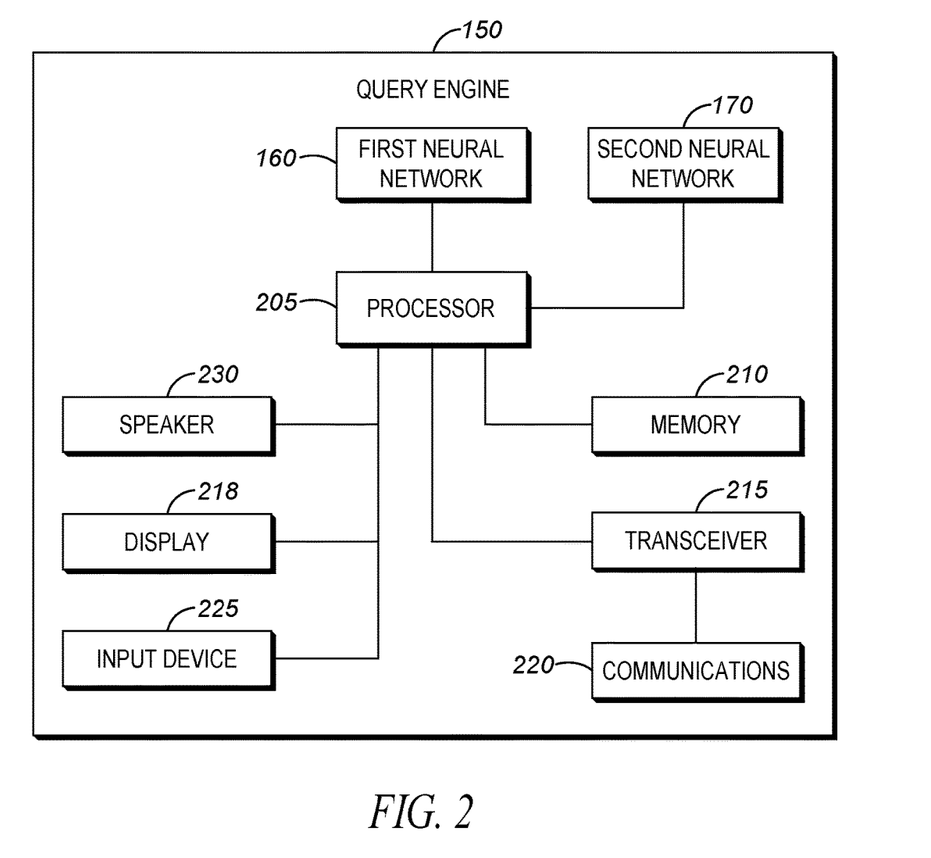
FIG. 2 shows a block diagram of a query engine, according to an example embodiment.

FIG. 2 is a block diagram of the query engine 150 of system 100 according to one embodiment. In the example shown, the query engine 150 includes an electronic processor 205 (for example, a microprocessor or another electronic device). The electronic processor 205 may include input and output interfaces (not shown) and, in the example shown, is electrically connected to a memory 210, a transceiver 215 including or connected to an antenna (the combination of which may be referred to as a first network interface), the first neural network 160, the second neural network 170, the display 218, an input device 225 (e.g., a button, mouse, touchpad, microphone, keypad, etc.), communications 220 (e.g. an antenna), and a speaker 230. In some embodiments, the query engine 150 may include fewer or additional components in configurations different from that illustrated in FIG. 2. As an example, the query engine 150 may not include one or more of the first transceiver 215 and the communications 220, the display 218, the input device 225, and the speaker 230. In some embodiments, the query engine 150 performs additional functionality than the functionality described below.

In an example embodiment first and second neural networks are associated with query source 120 and database 140, and are selected via a switching process which directs the query and query response to the associated neural network out of a plurality of neural networks available at query engine 150. In an alternative example embodiment, first and second neural networks receive queries and query responses from a plurality of query sources 120 and databases 140, respectively, from different jurisdictions. In this case, more extensive training of first and second neural networks is required.

The memory 210 includes read only memory (ROM), random access memory (RAM), other non-transitory computer-readable media, or a combination thereof. The electronic processor 205 is configured to receive instructions and data from the memory 210 and execute, among other things, instructions. In particular, the electronic processor 205 executes instructions stored in the memory 210 to perform the methods described herein.

The transceiver 215 and communications 220 (i.e., the network interface) is configured to send and receive data to and from an external device (e.g., the query source 120 and database 140) and/or a communication network. For example, the transceiver 215 is a wireless communication transceiver for wirelessly communicating with external devices and/or networks, such as the Internet, a wide area network, or a local area network. Alternatively or additionally, the network interface may include a connector or port for receiving a wired connection to an external device or network, such as an Ethernet cable.

First neural network 160 and second neural network 170 are neural networks that may be trained using pairs of query/responses to translates queries and responses, respectively, as described further below. Either the query or query response in the query/response pairs may be in structured or semi-structured formats. Neural networks 160 and 170 are trained rather than explicitly programmed, and may be pre-trained.

Neural networks 160 and 170 translate query and database formats, respectively. Each neural network 160, 170 has an architecture that supports inputting sequences of input tokens (e.g. words from the query in the first format or query response in the second format, as applicable), and outputting sequences of output tokens (e.g. words for the query in the second format or query response in the first format, as applicable). The architecture is one of, or is a combination of, several possible architectures.

According to an example embodiment, the architecture is a recurrent neural network. A recurrent neural network maintains a single calculation unit that ingests an input token and a state vector, then emits an output token and a state vector that is propagated to the input of a subsequent unit. The state vector is an actual real-valued vector encoding a history of tokens seen prior to the current token being considered by the neural network.

If the neural network is a uni-directional network, the state vector encodes information about the history of all tokens that preceded the current token. If the neural network is a bi-directional network, then there are two state vectors (or the state vector can be considered one vector with two parts), namely a state vector that encodes "history" coming from the input tokens and "future" coming from output tokens.

Since the neural network in this architecture inputs a state vector and outputs a new state vector (to adjoining computing unit(s)), recurrent neural networks provide connection between the input token under evaluation and all other tokens in the stream.

According to another example embodiment, the architecture is a convolutional neural network where each calculation unit ingests an input token and its neighbour tokens and produces an output token.

According to another example embodiment the architecture is an attention mechanism architecture where each calculation unit takes as input all of the input tokens in order to produce each output token, in turn assigning an attention weight to each input token based on its importance in computing the output token.

According to another example embodiment, the architecture combines a recurrent neural network with an attention mechanism, which weights each input token according to an attention mechanism and each calculation unit combines the weighted input tokens with a propagated state vector.

Each architecture includes a stack of two sub-architectures including an encoder network and a decoder network. The sub-architectures can be connected such that a different sub-architecture is used for the encoder network than is used for the decoder network. The encoder network ingests input tokens and produces a sequence of vectors or a single vector as output. The decoder network takes the sequence of vectors or the single vector as input and produces a sequence of output tokens as output.

Regardless of the specific architecture, each neural network is parameterized by real-valued numbers. A training procedure selects optimal values for these parameters such that once trained, sequences of output tokens constitute the same meaning in the first format as is expressed in the second format for first neural network 160, and the same meaning in the second format as is expressed in the first format for second neural network 170. In this way, databases 140 with differing target formats can be queried using a common source database language by determining different parameters and possibly different architectures for each target format.

Training the neural network parameters can be accomplished in several steps. In an example embodiment, the decoder sub-architecture can be pre-trained using a collection of database 140 tokens. At each step of pre-training, the decoder attempts to predict from a previous sequence of database 140 tokens what a subsequent database 140 token will be. Errors in this prediction are propagated through the decoder network to ascertain the degree by which each network parameter should be adjusted, and the process repeated. This is referred to as differential learning, for which several mechanisms are known.

Following this optional pre-training, the entire encoder-decoder architecture is trained by ingesting source tokens from the query source format and comparing the output tokens produced to a known example of correct database 140 tokens. Errors in this prediction are propagated back through the architecture to adjust parameters by differential learning. This process is thus repeated for many known query source 120 token, database 140 token pairs.

In the case where the same query source format is to be converted to several different target database formats, the final training of the encoder sub-architecture can be initialized by copying parameters used for other query source format/database format use cases. This speeds up training new neural networks for new target database formats by re-using information gained by previously-trained neural networks.

Figure 3:
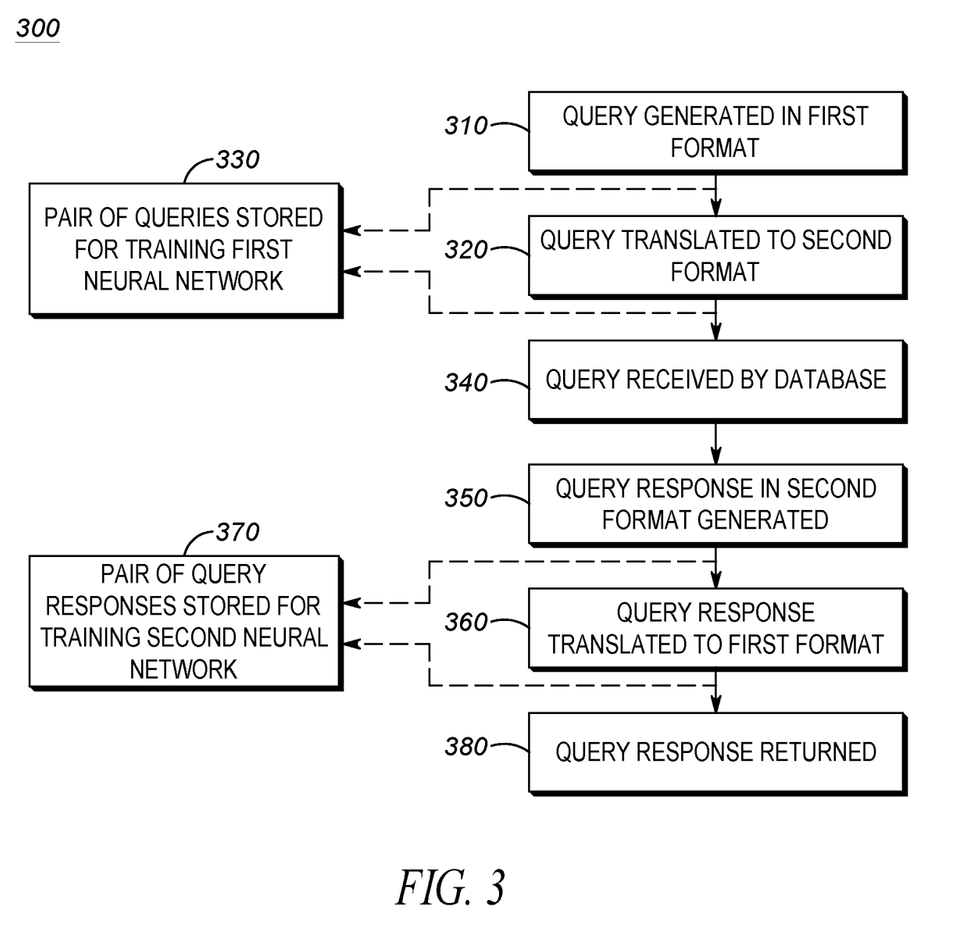
FIG. 3 shows a flow chart showing the flow of information for training a neural network according to an example embodiment.

Referring now to FIG. 3, a method 300 is shown whereby pairs of translated queries and responses are obtained for use in training first and second neural networks 160, 170 in circumstances where a parser for a particular pair of query source 120 and database 140 exists.

At block 310 a query is generated by query source 120 in a first format. At block 320 the query is translated by the parser into the second format. This translation may be accomplished by using a parser specific to translating queries from the first format to the second format but that is unable to translate queries in other formats; alternatively, the translation can be done manually. At block 330 the pair of the query in the first format and the query in the second format are stored for training first neural network 160.

At block 340, the query, in the second format is received by database 140. At block 350, the query response, in the second format, is returned. The query response in the second format is then translated, at block 360, to the first format, using the means for translation as described above with reference to the translation of the query. At block 370 the pair of responses in the first and second format are stored for provision to the second neural network 170 for training. At block 380, the query in the second format, is returned to the query source 120.

Figure 4:
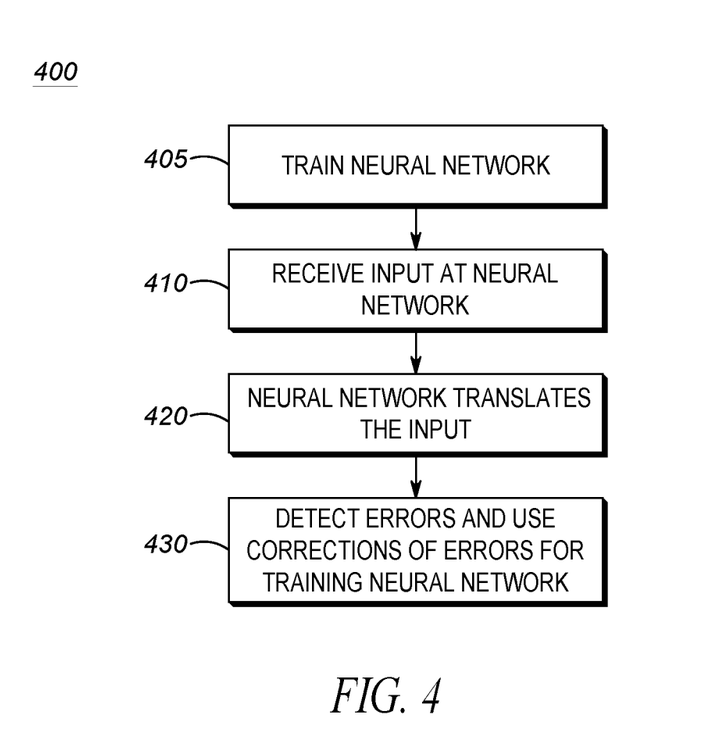
FIG. 4 shows a flow chart showing the neural translation of structured data according to an example embodiment.

Referring now to FIG. 4, a method 400 of neural translation of queries and query responses of structured or semi-structured data, and training of neural networks is shown. At block 405, training data is provided to neural network 160, or 170 as described above to train the neural network. Once a certain amount of training data has been provided, at block 410 input is received at the neural network 160 or 170. In the case of neural network 160, the input would be a query in the first format; in the case of neural network 170, the input would be the query response in the second format. At block 420 the neural network translates the input and predicts the structured output, i.e. in the case of neural network 160, the output would be a query in the second format; in the case of neural network 170, the output would be the query response in the first format. If errors are detected the corrections can be used for further training at block 430. The training of neural networks will normally take place using query and query response pairs collected as described above, which can be done in an automated fashion not requiring any human intervention, and which can be done in a trusted execution environment, which makes compliance for handling sensitive data simpler.

The trusted execution environment may be a system of computers and a network that excludes all communication between computers in the environment and any computers outside the environment, except for specifically sanctioned communications. The sanctioned communications are logged and limited to permitted computers that lie outside the environment. This allows for the addition of new computers within the trusted execution environment, provided the new computers communicate only with other computers within the environment, and not with computers outside the environment.

Figure 5:
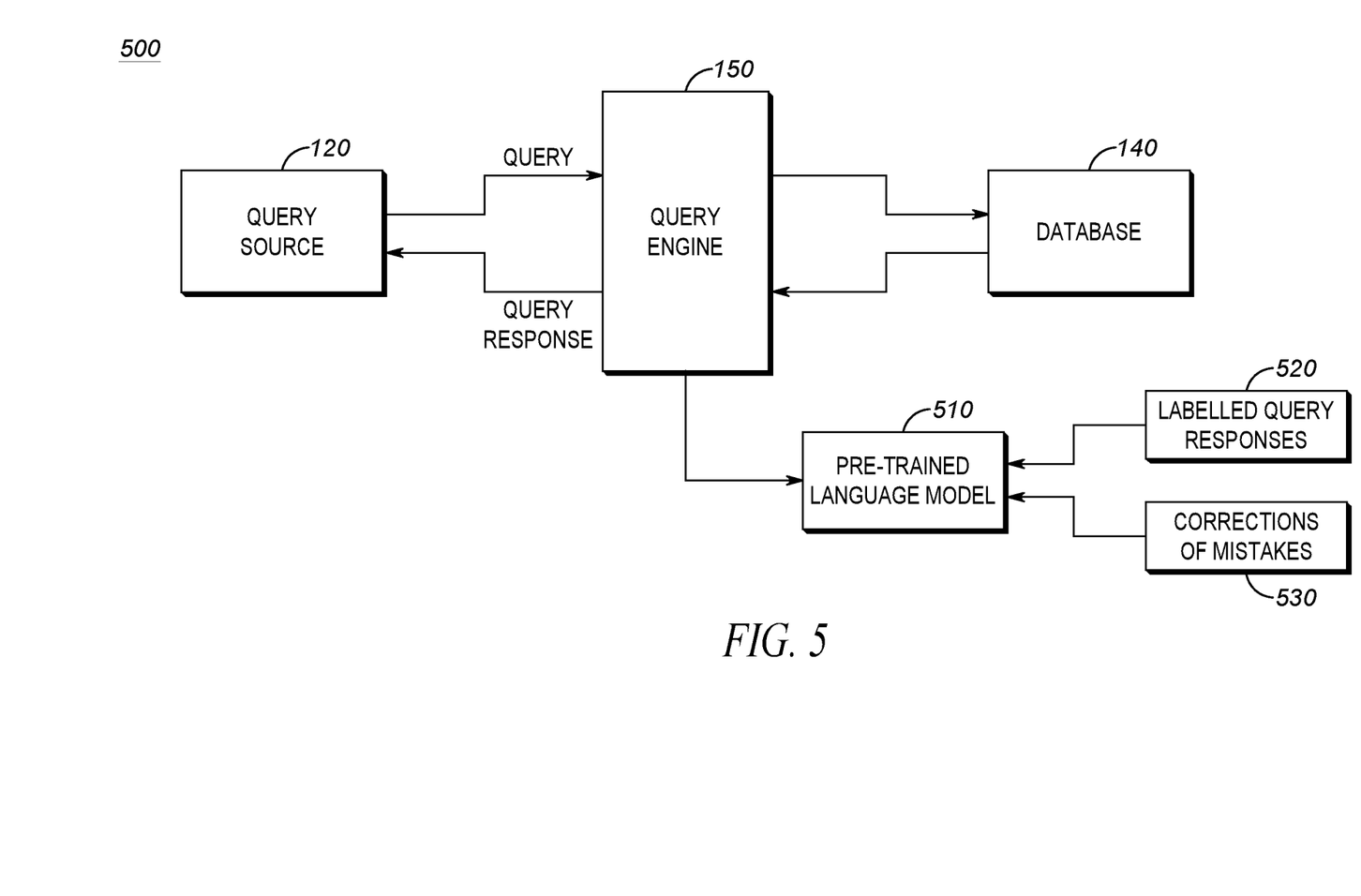
FIG. 5 shows a flow chart showing semi supervised training of a neural network for translation of structured data, according to an example embodiment.

Referring now to FIG. 5, a flow chart 500 showing semi supervised training of a neural network for translation of structured or semi-structured data is shown, according to an example embodiment. Query source 120 sends a query to database 140, and receives a query response therefrom, with both query and query response passing through query engine

150. The query responses are sent to a pre-trained language model 510. Pre-trained language model 510, besides receiving large numbers of responses, also receives labelled query responses from a target jurisdiction (block 520) and corrections of mistakes (block 530) made by pre-trained language model 510.

This embodiment is appropriate in cases in which there is no existing parser for translation, but there are large numbers of query responses available.

Figure 6:
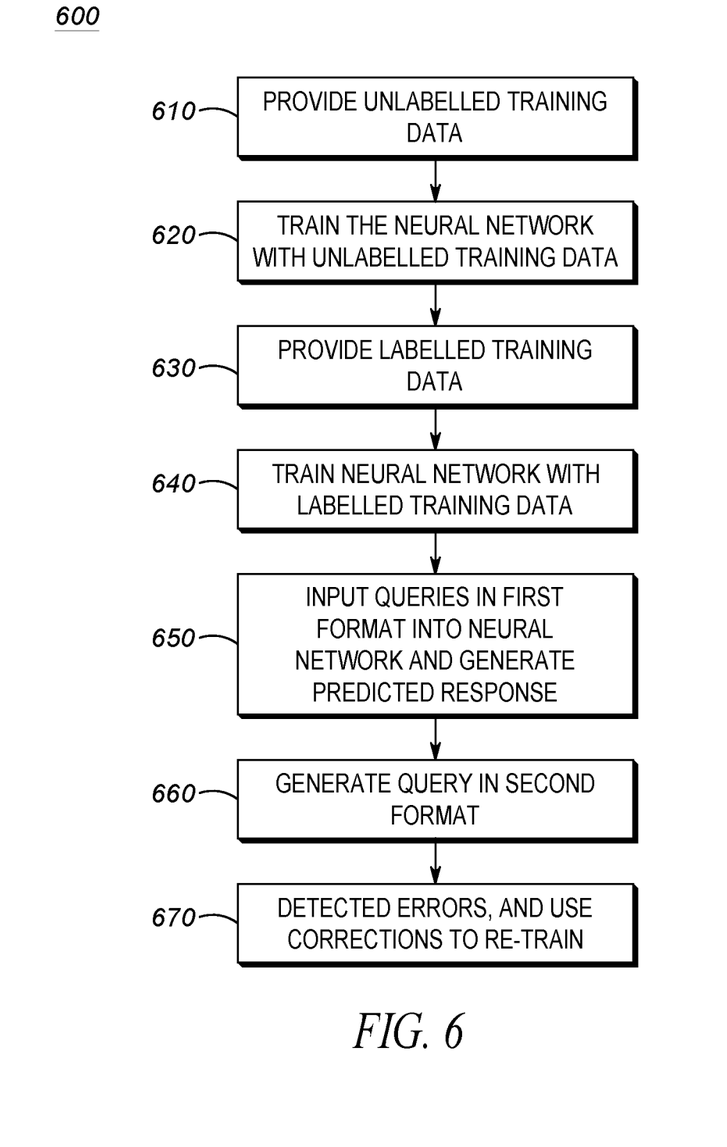
FIG. 6 shows a flow chart showing semi-supervised neural translation of structured data, according to an example embodiment.

Referring to FIG. 6, a flow chart showing a method 600 of semi supervised neural training and translation of semi-structured or structured data is shown, according to an example embodiment. At block 610 pre-training data is provided by obtaining unlabeled training data, such as queries, which may be generated from a live query source 120 or database 140. The unlabeled training data in the embodiment shown is queries, however in an alternative embodiment, the unlabeled training data may be query responses.

At block 620 the pre-training data is used to train the neural network, in the embodiment shown, neural network 160, which allows neural network 160 to represent patterns in the queries. In an embodiment this process can be entirely automated with no human intervention required, which makes it easier to comply with requirements for processing sensitive data.

Neural network 160 goes through a fine-tuning process after pre-training. Labeled training data, in pairs of queries and query responses is provided at block 630. Only a small amount, as few as hundred cases or less, of this labelled training data is needed. This labelled training data may be generated automatically or may be human generated. At block 640, the labelled training data is used to train first neural network 160 and improve the pretrainined first neural network 160 to be able to convert queries from a first format to a second format.

Once trained as described above, queries in a first format are input into neural network 160, and at block 650, a predicted query response is generated, the query response representing the canonical format required by the request, and at block 660, the query in the second format is generated and sent to database 140. At block 670, any errors can be detected by comparing the generated query response to the query response received from database 140, and corrections used to re-train first neural network 160. Method 600 is also applicable to second neural network 170, however query responses in the first format are used as input at block 650, and the query is predicted at block 660, and used to generate query response in the second format.

Figure 7:
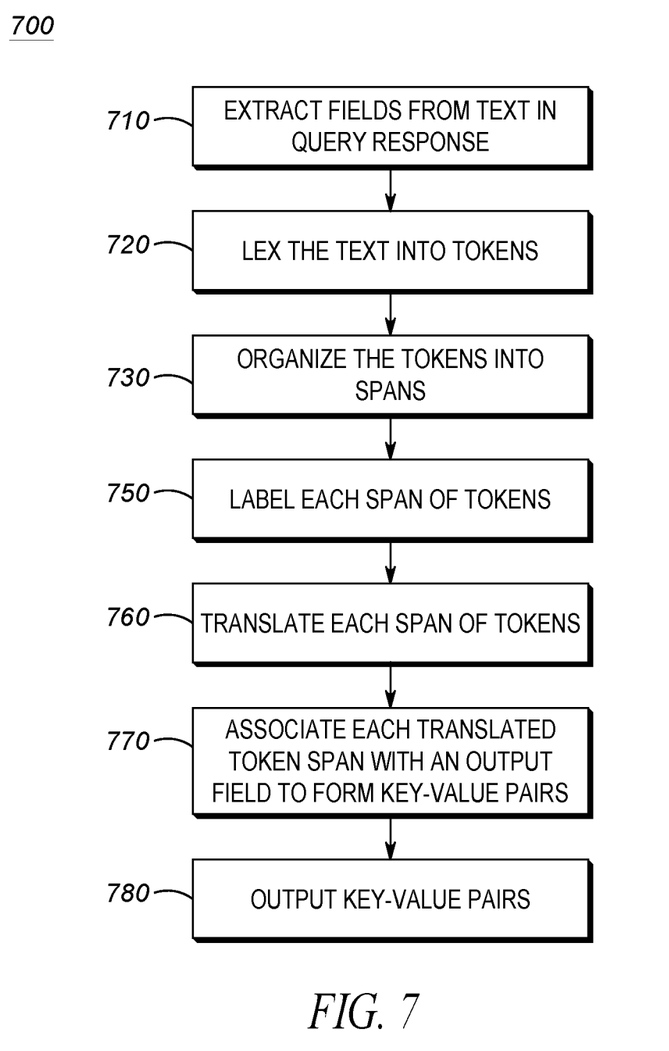
FIG. 7 shows a flow chart showing a field mapping process performed by the system, according to an example embodiment.

Referring now to FIG. 7, at a lower level method 700 shows how predicted interactions with databases and query sources use common format/output fields according to an example embodiment, which normalize the mapping of the fields from the first format to the second format and vice versa.

Method 700, trains the neural networks 160, 170 to lex structured or semi-structured data into suitable tokens (structured data fragments which may not be appropriately delimited by spaces alone). Token spans are then identified and associated with particular target fields (e.g. name, drivers' license, arrest history, addresses). The identified token spans are then translated using a common output specification. The common output specification defines the vocabulary and format of an output key-value structure.

For example, in resolving database queries, a sequence of key-value pairs must be determined, which are referred to as a common format output field. These key-value pairs are represented in a pattern that is independent of how its information was received at the input to the network. The "format" is the representation pattern; a "field" is a key-value pair. For example, {"upper-body": {"color": "blue", "type": "jacket" } } uses a format of nested curly braces, commas and colons, and there are keys for three fields: "upper-body", "color" and "type". The fields in this example are nested.

The vocabulary and format of the output key-value structure are referred to as the common output specification. In the nested example above, a list of top-level and then lower-level keys are allowed (e.g. "upper-body" might be top-level, but "color" and "type" are nested under a top-level key) as well as values are allowed (e.g. "blue" is a permitted color but "jacket" is not). The output specification can be represented in a finite manner, but may permit an exponentially large or infinite output cardinality because of nested or recursive representations, respectively.

Method 700 begins, at block 710 by extracting fields from structured or semi-structured text in a query response received from a database 140 that has been input the processor 205. At block 720, the structured or semi-structured text is then lexed into tokens. This lexing may, for example, be done by a subword tokenizer, which has been trained by having automated access to examples of structured or semi-structured text from the database 140. At block 730 the tokens are organized into spans, and at block 750 each span is labelled, for example by neural network 160 or 170, to represent a common format output field.

At block 760 each span of tokens is translated according to the common output specification into translated token spans; and at block 770 each translated token span is associated with a corresponding format output field to form key-value pairs, which at block 780 are output from processor 205.

Neural networks 160, 170 may be trained by automated and temporary exposure to a plurality of examples of structured and/or semi-structured text from the database 140 and a plurality of key-value pairs. The neural network training may take place in a secure computing environment, wherein neither the structured text from the database system nor the key-value pairs is exposed to any human user, for example, the training may take place in a trusted execution environment.

As described above neural networks 160, 170 may be pre-trained, for example, according to an example embodiment, the neural networks 160, 170 repeatedly receive inputs of examples of structured or semi-structured text in a second format from database 140; and the weights of the neural network are then adjusted to perform an unsupervised translation to the first format. The training examples can then be deleted, i.e. they need not be retained, which enhances the security of the information.

Following the above process, supervised training is conducted wherein neural networks 160, 170 receive as input structured or semi-structured text from the database 140 and the labeled spans; the structured or semi-structured text is tokenized into tokens, and the tokens are identified in the labeled spans. The pre-trained neural network then computes feature values over the tokens; and adjusts at least a weight of the neural network 160, 170. The pre-training may also take place in a trusted execution environment.

The supervised neural network can then be used to predict label spans from structured or semi-structured text from database 140 and the pre-trained version of the neural network can compute feature vectors over tokens for the same structured or semi-structured text. The correct labelled spans can be compared to the predicted label spans, and if they are not the same, the supervised neural network can be updated using the correction and the computed feature values over the tokens.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot [include a particular function/feature from current spec], among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of processing a query to a public safety database from a query source, comprising:
   receiving the query for the public safety database, the query in a first format supported by the query source;
   inputting the query into a first neural network;
   outputting, by the first neural network, the query in a second format, wherein the second format is a semi-structured format supported by the public safety database;
   receiving, from the public safety database, a response to the query, the response in the second format;
   inputting the response to the query into a second neural network;
   outputting, by the second neural network, the response to the query in the first format;
   wherein the first neural network is trained by inputting a first plurality of pairs of semi-structured data, each pair of semi-structured data comprising a sample query in the first format and the sample query in the second format;
   wherein the second neural network is trained by inputting a second plurality of pairs of semi-structured data, each pair of semi-structured data comprising a sample response in the second format and the sample response in the first format;
   wherein the first neural network is pre-trained with a plurality of queries in the second format without providing access to the plurality of queries to the query source, wherein the pre-training occurs in a trusted execution environment, wherein the trusted execution environment is a system of computers and a network that excludes all communication between computers in the environment and any computers outside the environment, except for specifically sanctioned communications;
   determining if a parser already exists for the public safety database, and on determination of the existing parser, training the first and second neural networks in a supervised manner using the existing parser, otherwise training the first and second neural networks in an unsupervised pre-training manner followed by a supervised manner on labelled training data.

2. The method of claim 1 wherein the second neural network is pre-trained with a plurality of responses in the second format.

3. The method of claim 1, wherein the query in the first format and the query in the second format are used to further train the first neural network.

4. The method of claim 1, wherein the response in the second format and the response in the first format are used to further train the second neural network.

5. A data processing system, comprising:
   a processor; and
   a memory device having stored thereon computer program code that is executable by the processor, and that when executed by the processor causes the processor to perform the method of claim 1.

6. A method of processing a query to a plurality of public safety databases from a query source, comprising:
   receiving the query for the plurality of public safety databases, the query in a first format supported by the query source;
   inputting the query into a plurality of first neural networks;
   outputting, by each neural network in the plurality of first neural networks, the query in a plurality of respective second formats, wherein each second format is a semi-structured format supported by a respective one of the plurality of public safety databases;
   receiving, from the plurality of public safety databases, a corresponding plurality of responses to the query, the responses in a plurality of different second formats;
   inputting each of the plurality of responses to the query into a corresponding second neural network of a plurality of second neural networks;
   outputting, by each of the second neural networks, a corresponding modified second responses to the query in the first format;
   wherein the plurality of first neural networks are trained by inputting a first plurality of pairs of semi-structured data, each pair of semi-structured data comprising a sample query in the first format and the sample query in the second format;
   wherein the plurality of second neural networks are trained by inputting a second plurality of pairs of semi-structured data, each pair of semi-structured data comprising a sample response in the second format and the sample response in the first format;
   wherein the first and second pluralities of neural networks are pre-trained in a trusted execution environment with respect to the plurality of public safety databases, without providing access to a plurality of sample queries to the query source; wherein the trusted execution environment is a system of computers and a network that excludes all communication between computers in the environment and any computers outside the environment, except for specifically sanctioned communications; and
   for each of the plurality of public safety databases, determining if a parser already exists for each particular one of the plurality of public safety databases, and on determination of the existing parser, training corresponding first and second neural networks of the plurality of first neural networks and the plurality of second neural networks, respectively, in a supervised manner using the existing parser, otherwise, training the first and second neural networks in an unsupervised pre-training manner followed by a supervised manner on labelled training data.

7. A data processing system, comprising:
a processor; and
a memory device having stored thereon computer program code that is executable by the processor, and that when executed by the processor causes the processor to perform the method of claim 6.

\* \* \* \* \*